United States Patent [19]
Brusaglino

[11] 3,736,482
[45] May 29, 1973

[54] BATTERY POWERED ELECTRIC TRACTION SYSTEM

[75] Inventor: Giampiero Brusaglino, Moncalieri, Italy

[73] Assignee: Fiat Societa per Azioni, Turin, Italy

[22] Filed: Oct. 28, 1971

[21] Appl. No.: 193,290

[30] Foreign Application Priority Data

Nov. 17, 1970 Italy................................70832 A/70

[52] U.S. Cl.............................318/338, 318/378
[51] Int. Cl............................H02p 7/06, H02p 3/14
[58] Field of Search....................318/139, 338, 493, 318/376–378

[56] References Cited

UNITED STATES PATENTS

| | | | |
|---|---|---|---|
| 2,519,118 | 8/1950 | Curtis | 318/338 |
| 3,569,809 | 3/1971 | Comer | 318/338 |
| 3,388,306 | 6/1968 | Koppelmann | 318/338 |
| 3,280,397 | 10/1966 | Bruns | 318/338 |
| 2,911,580 | 11/1959 | Gould | 318/338 |
| 3,546,548 | 12/1970 | Wouk | 318/376 |

Primary Examiner—Bernard A. Gilheaney
Assistant Examiner—Thomas Langer
Attorney—Richard C. Sughrue, Gideon Franklin Rothwell, Robert V. Sloan et al.

[57] ABSTRACT

A speed controlled electric traction system comprising a direct current compound electric motor having means for controlling its speed from zero up to its maximum value with a minimum energy loss on the speed regulation. The means for controlling the speed of the motor comprise a rheostat in series with the shunt field windings of the motor and linked to a voltage controller in series with the series field winding and armature of the motor. The voltage controller can be one of a number of different types such as a rheostat, a potentiometer allied to a controlled rectifier or a potential dividing switch arrangement acting on the individual cells of the battery. The voltage controller of the armature circuit and the rheostat of the shunt winding are linked together and to an operating member such that as the motor is controlled from standstill the maximum voltage is applied to the shunt winding as the voltage on the armature winding is progressively increased up to a maximum value, and thereafter the voltage on the armature winding is maintained at a maximum while the voltage on the shunt field winding is progressively reduced until the motor attains its maximum speed.

3 Claims, 4 Drawing Figures

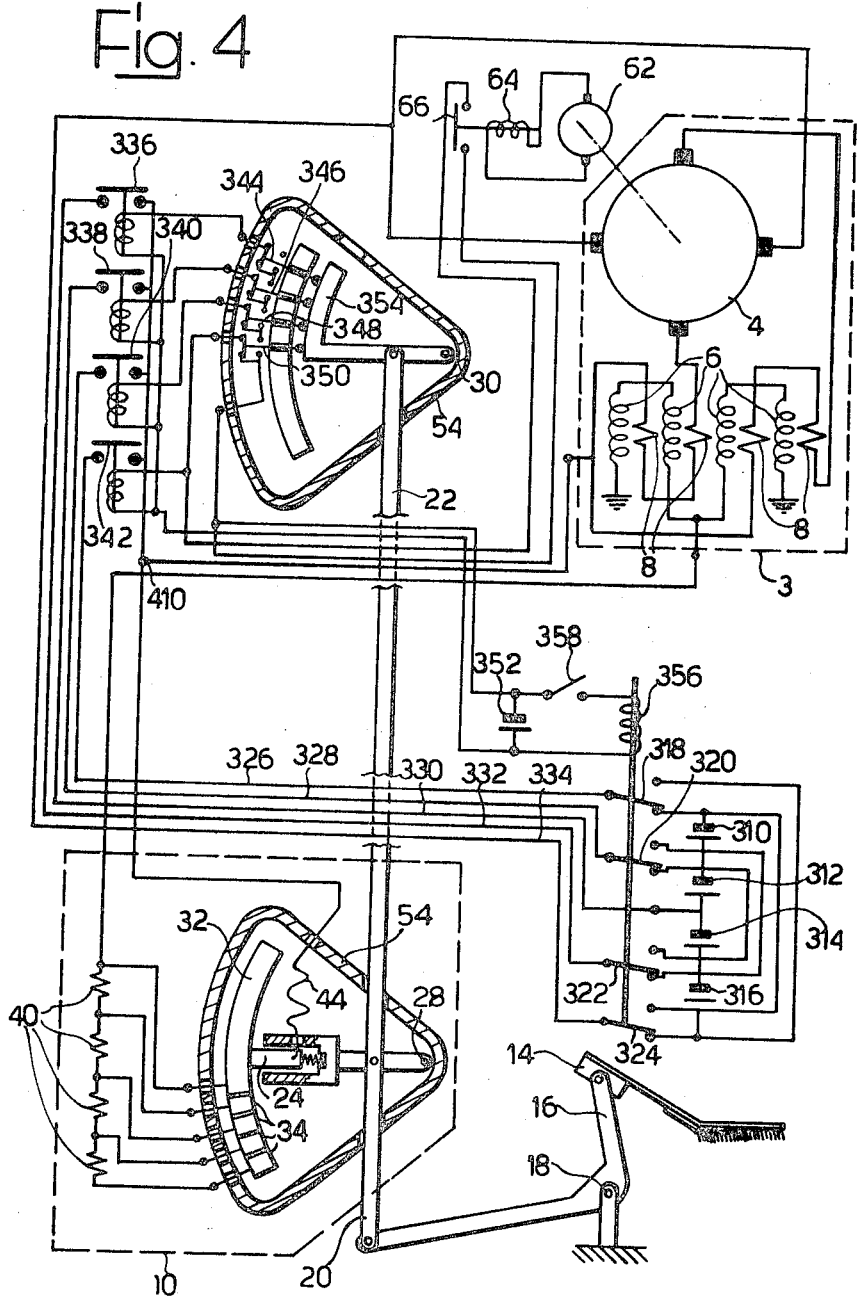

BATTERY POWERED ELECTRIC TRACTION SYSTEM

BACKGROUND OF THE INVENTION

The present invention relates to a battery powered electric traction system especially for motor vehicles, in which the speed is controlled by means of adjustment to an electric motor of the compound excitation type. This is effected in part by means of a speed regulating rheostat in series with the shunt winding and operated by the accelerator pedal or by a suitable hand lever.

Electric traction systems of the above type, powered by a battery such as an accumulator, are already known, and one of the disadvantages of known systems is the power loss involved in speed regulation.

Electric traction systems of this type in which the power loss on speed regulation has been reduced are also known, such systems have advantages over the unmodified systems as far as general performance is concerned in that the energy dissipated by the speed regulating device may be regarded as substantially negligible. Some of these systems also have the advantage of dynamic braking by the motor similar to that of thermal engines, and the added advantage of energy regeneration with this braking effect.

On the other hand, in previously known systems, the velocity of the engine cannot be allowed to fall below a predetermined speed, which corresponds to maximum excitation, and for this reason the known systems have required gears and a clutch in the same way as internal combustion engines.

It would be desirable, however, to provide a battery powered electric traction system which would have the advantages of energy regeneration and dynamic braking, and which would in addition make it possible to dispense with gears and clutch, thereby simplifying the structure of the system, reducing the manufacturing costs, and increasing the reliability of operation of the traction system.

SUMMARY OF THE INVENTION

According, therefore, to the present invention, there is provided a battery powered electric traction system characterized in that it comprises a direct current compound electric motor, a rheostat in series with the shunt excitation field winding of the motor, a voltage regulating device in circuit with the armature of the motor, the voltage regulating device being linked to the said rheostat, an operating member for the rheostat and the voltage regulating device, the operating member being movable between a rest position corresponding to de-energization of the motor, and a second position corresponding to maximum speed of the motor, the connection between the rheostat and the regulating device being such that as the operating member is moved away from the rest position the voltage regulating device first causes the voltage in the armature circuit to increase progressively from nil to the maximum provided by the battery, whilst the rheostat maintains the voltage in the shunt winding constant and at a maximum value, and subsequently the voltage regulating device keeps the voltage in the armature circuit at the said maximum level, whilst the rheostat progressively reduces the voltage in the shunt winding, and means for maintaining the armature circuit closed even when the operating member is returned to its rest position as long as the speed of the motor remains above a predetermined value.

Various other features and advantages of the present invention will become apparent from a consideration of the following description with reference to the accompanying drawings which is given purely by way of non limiting example.

BRIEF DESCRIPTION OF THE DRAWINGS

FIG. 4 is a circuit diagram of a variant of the embodiment of the invention illustrated in FIG. 3.

DESCRIPTION OF THE PREFERRED EMBODIMENT

Figure 1:
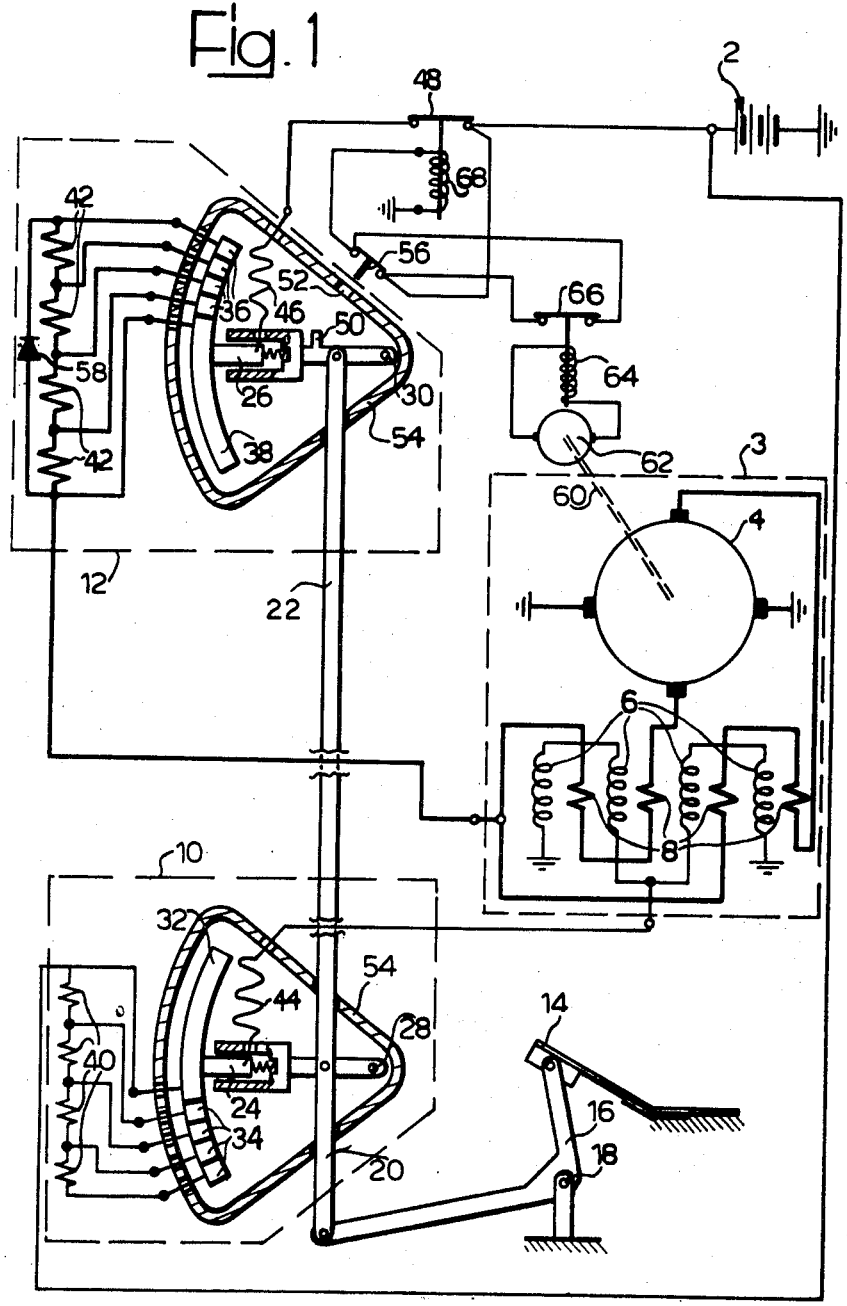
FIG. 1 is a schematic circuit diagram of an electric traction system constructed as a first embodiment of the invention.

With reference now to FIG. 1 which illustrates a first embodiment of the invention, there is shown a battery 2 which is arranged to supply the current for the armature and the series field winding, and also for the shunt field winding of a direct current compound electric motor 3, the battery may be an accumulator having a plurality of cells, or may, for example, be a plurality of accumulators depending on the power requirements of the motor. The motor 3 is arranged as a traction motor for a motor vehicle, and comprises an armature 4, a shunt excitation or field winding 6 and a series excitation or field winding 8.

A rheostat 10 controls the current flowing through the shunt excitation winding 6 and a rheostat 12 controls the current flowing through the armature and the series excitation winding 8. An accelerator pedal 14 controls the angular position of a bell-crank lever 16 which is pivoted at 18 to a point fixed to the chassis of the vehicle. The bell-crank lever 16 is connected to a rod 20 which is coupled to the wiper arm of the rheostat 10. The rod 20 has an extension 22 which is connected to the wiper arm of the rheostat 12 so that both rheostats are controlled simultaneously.

Both the rheostat 10 and the rheostat 12 are of the same type, and each consists of a wiper arm carrying a brush, 24 and 26 respectively, and pivoted respectively at 28, 30. The brushes 24 and 26 slide along rows of contacts 32, 34 and 36, 38 respectively. The contacts 32, 34, 36 and 38 are arranged in an arc of a circle and are connected to respective groups of series resistors, 40 and 42. The brushes 24 and 26 26 are also connected to the external circuit by means of flexible conductors, 44 and 46 respectively. A return spring (not illustrated) is arranged in contact with the pedal 14 so that when the pedal is not operated it keeps both the brushes 24 and 26 in the position of maximum clockwise rotation when viewed as shown in Fig. 1.

The rheostat 10 comprises a long contact 32 corresponding to the first section of travel of the brush 24; this contact 32 is connected directly to the positive pole of the battery 2 and extends for just over half of the arc occupied by the row of contacts, of the rheostat 10. The other half of the row of contacts is subdivided into equal short contracts 34 of which four are shown in FIG. 1; each of the contacts 34 is connected between successive series resistors 40 arranged in series with the positive pole of the accumulator 2. Movement of the brush 24 from the rest position therefore successively switches in the resistors 40 as each of the contacts 34 is reached in turn. The brush 24 is connected to a flexible conductor 44 which, in turn, is connected to the shunt excitation windings 6 and hence to earth.

The rheostat 12 similarly comprises several short contacts 36 (again, four of which are shown in FIG. 1), however, in this case they are located along the first section of travel of the brush 26 and are coupled to series connected resistors 42 such that as the brush is moved anti-clockwise (as seen in FIG. 1) from its rest position, the resistors 42 are successively switched out of the circuit. The rheostat 12 also has a long contact 38, extending for just over half of the total length of the row of contacts. The brush 26 is connected to a flexible conductor 46 which, in turn, is connected to a control switch 48 and thence to the positive pole of the battery 2; the long contact 38 is directly connected to the series excitation field windings 8 and thence to the armature 4 of the motor 3.

The wiper arm which carries the brush 26 of the rheostat 12 also carries a small catch 50 which is arranged to project through an opening 52 in the housing 54 of the rheostat 12 and to open the contacts of a microswitch 56, when the bush 26 is in the rest position, that is the position at the top in the illustration. When the pedal 14 is operated the catch 50 is moved away from the microswitch 56 which therefore closes and allows current to flow from the battery through the coil 68 to close the remote control switch 48 and thereby apply a voltage from the battery 2 to the brush 26.

A diode 58 is connected in parallel with the group of series resistors 42 for reasons which will be described in detail below.

To the shaft 60 of the motor 3 there is connected a dynamo 62 which is connected to energize a coil 64 of a relay the contacts 66 of which are in parallel with the contacts of the switch 56.

The speed control device described above operates as follows. In the rest position the two brushes 24 and 26 of the rheostats 10 and 12 are rotated clockwise to the position where the brush 26 engages with the end contact 36 and the microswitch 56 is held open by the small catch 50 on the wiper arm. The coil 68 is therefore de-energized and the contacts 48 are open.

By operating the pedal 14 the small catch 50 is moved away from its initial position, thereby closing the switch 56; this excites the coil 68 and closes the switch 48 thereby applying voltage to the brush 26 from the accumulator 2. Thus current flows through the brush 26, the first contact of the row of contacts 36 of the rheostat 12, the entire group of series connected resistors 42, the series excitation field windings 8 and the armature 4 of the motor 3. The motor is thus energized with the armature voltage increasing progressively as the brush 26 of the rheostat 12 is moved across successive contacts 36 to cut out the successive resistors 42 of the armature circuit, whilst the brush 24 travels along the long contact 32 thus keeping the shunt excitation current at a constant and maximum value since none of the resistors 40 are connected in the circuit.

When the brush 26 of the rheostat 12 reaches the long contact 38, the armature 4 of the motor 3 is being fed with the full voltage of the accumulator 2 since all the resistors 42 are switched out of the circuit. Further movement of the accelerator pedal causes the brush 24 of the rheostat 10 to start to engage the short contacts 34, thus progressively switching in the resistances 40 thereby reducing the excitation of the shunt winding to increase the speed of the motor 3.

Above a predetermined speed of the motor 3, the dynamo 62 begans to generate sufficient voltage to excite the relays to close the contacts 66 to establish an excitation circuit for the relay 68 which bypasses the switch 56 so that even if the switch 56 is opened the contacts 48 remain closed provided the motor 3 is running fast enough. Therefore when, with the vehicle travelling, the accelerator pedal 14 is completely released to allow the brush 26 to return to the initial rest position where by means of the catch 50, it opens the switch 56, the armature current of the motor 3 is not switched off so that dynamic braking with energy regeneration is obtained on over run, that is when the vehicle is travelling faster than the motor 3 and causing the motor to turn and act as a generator. The armature circuit opens again when the relay 64, 66 is de-energized as the speed of the motor falls below the said predetermined value. By suitable choice of the calibrating value of the relay 64 it is possible to cause the opening of the armature circuit to coincide with the end of the regeneration of energy from the motor to the battery.

During the regeneration phase the diode 58 in parallel with the resistors 42 allows the current to circulate directly from the motor to the battery without passing through the resistors 42 which would otherwise give rise to a voltage decrease.

Figure 2:
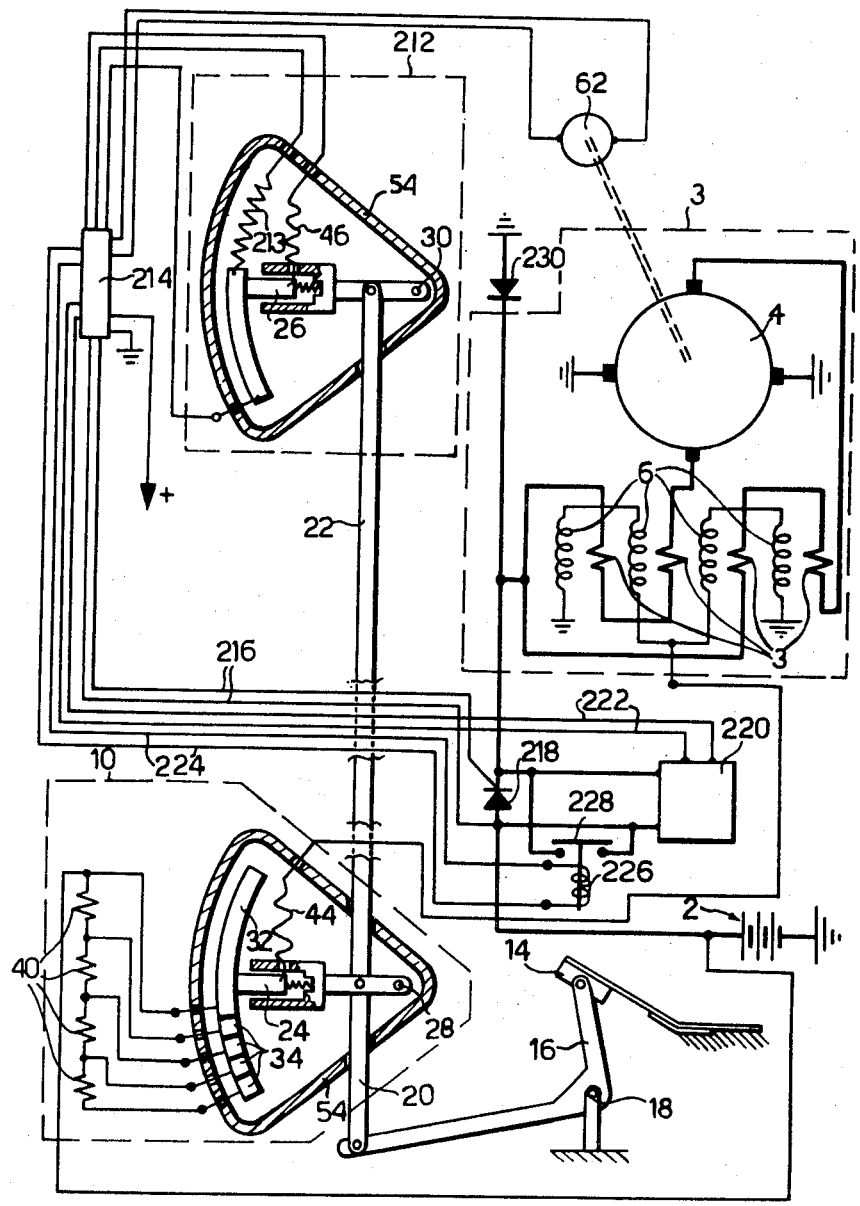
FIG. 2 is a circuit diagram of an electric traction system constructed as a second embodiment of the invention.

With reference now to FIG. 2, there will be described a second embodiment of the invention, which allows a speed control to be effected without the dissipation of power which, in the embodiment of FIG. 1, occurs in the resistors 42 of the rheostat 12 during the first phase of control of the speed of the motor. In this embodiment there is the same arrangement of the compound motor 3 and of the rheostat 10, but the rheostat 12 of FIG. 1 is replaced by a potentiometer 212 and by a processor 214, and various other components which will be described in greater detail below.

The voltage signal on the brush 26 of the potentiometer 212 is compared in the processor 214 with the signal from the tachometric dynamo 62. As a result of this comparison the processor 214 sends firing signals to a controlled diode 218 via conductors 216, and quenching signals for switching off the said controlled diode 218 to a quenching circuit 220, via conductors 222 at a rate in dependence on the relative values of the two signals. The alternate switching on and off of the controlled diode 218 thus applies current impulses to the motor 3 such that the median value is dependent on the duration and frequency of closing of the controlled diode 218. By changing the position of the accelerator pedal 14, in the section which operates the variable resistor 213, the time and duration of firing of the controlled diode are adjusted, with consequent adjustment of current in the motor 3. This current may therefore vary between nil and the maximum value allowed by the circuit parameters. At the end of the path of the brush 26 along the resistor 213, that is, when the voltage applied to the engine has almost reached the value of the voltage of the battery, the electronic processor 214 energies, via conductors 224, a relay coil 226 which switches on a switch 228 thereby shortcircuiting the controlled diode 218 and directly applying the whole of the battery voltage to the engine.

From this point onwards control of the speed of the motor is transferred to the rheostat 10 which progressively reduces the shunt excitation current to increase the speed of the motor 3.

At the terminals of the motor there is inserted a diode 230, known as a "freewheel" diode, which absorbs the excess voltages which occur at the terminals of the motor at the instants when the controlled diode 218 passes from the conduction state to the non-conduction state. This reduces the pulses of the current to predictable values.

When the accelerator pedal 14 is released with the vehicle still travelling, the electronic processor 214, on the basis of a comparison of the signals of the potentiometer 212 and the tachometric dynamo 62 will keep the remote control switch 228 switched off until the end of the energy regeneration phase from the motor to the battery or batteries.

Hence, in this case, also, the motor can be controlled from standstill up to maximum speed whilst preserving the advantage of energy regenerating dynamic braking and high overall performance, thanks to the virtual absence of energy dissipating elements in the armature circuit of the motor 3.

Figure 3:
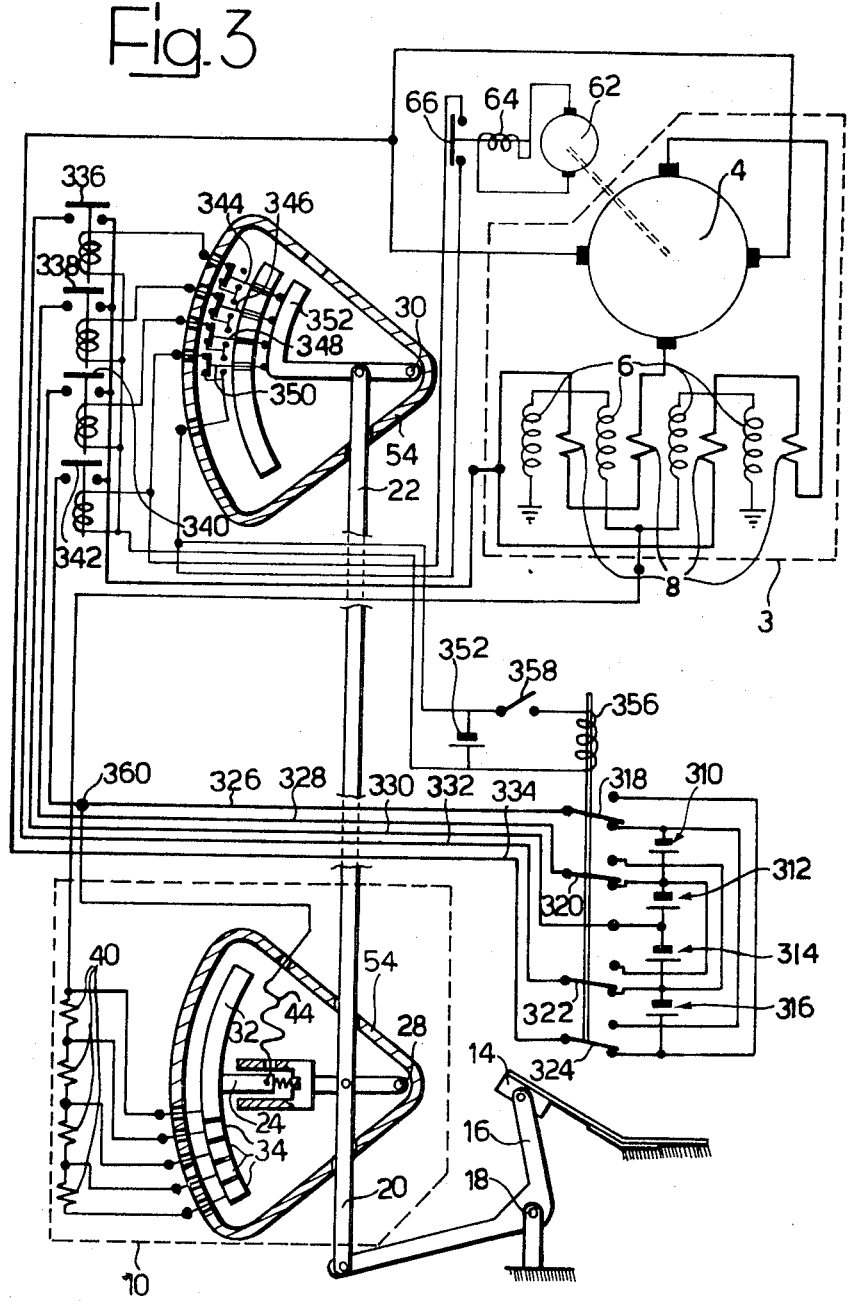
FIG. 3 is a circuit diagram of an electric traction system constructed as a third embodiment of the invention.

With reference now to FIG. 3 a further embodiment of the invention will be described. The components of this embodiment which are common to the previous embodiments bear the same reference numerals.

In this embodiment the accumulator 2 is subdivided into a number of cells 310, 312, 314, 316, connected by commutator switches 318, 320, 322, 324 (the purpose of which will be described later), and conductors 326, 328, 330, 332, 334, to respective poles of a plurality of relay contacts 336, 338, 340, 342. The coils operating the relay contacts 336, 338, 340, 342 respectively are excited by a small auxiliary battery 352 via the contacts of a plurality of microswitches 344, 346, 348, 350, which are progressively switched by a sector 354 controlled by the rod 20, 22 upon depression of the accelerator pedal 14 between its rest position and approximately half-way along its travel. The microswitches 344, 346, 348 and 350 are coupled together in series and the switch 350 is connected to one pole of the battery 352 so that as those switches are progressively switched, the power from the battery 352 is progressively switched to each of the relays 336, 338, 340, 342 in turn, so that each set of contacts is successively closed at the same time opening the immediately preceding relay. Therefore a progressively increasing voltage is applied to the armature of the motor 3, to progressively switch in the cells 310, 312, 314, 316 of the battery, until the maximum voltage which can be supplied by the battery is reached.

In this way control of the speed of the motor 3 from standstill to the greatest excitation of the separate (shunt) field is achieved. Up to this point in the travel of the accelerator 14 the brush 24 of the rheostat 10 has been in contact with the contact 32 and so has not switched in any reduction resistor to the shunt field winding of the motor 3.

If the accelerator is moved further the last microswitch 350 will remain operated by the sector 354 so that the relay 342 which switches in the entire battery to the armature of the motor 3 is held closed: simultaneously however, the brush 24 starts to switch in the resistors 40 in to the independent (shunt) excitation winding, which resistors 40, by reducing the field, increase the speed of the motor 3 as in the preceding embodiments.

When the accelerator is released while the vehicle is still travelling, the tachometric dynamo 62 keeps the relay 64 energized so that the contacts 66 are closed, until such time as the speed of the motor 3 has fallen to a predetermined level. The contacts 66 are connected across the last microswitch 350 so that the relay 342 thus remains energiced, and the armature circuit is kept closed thereby allowing the regeneration of energy from the motor to the battery or batteries. By suitable choice of the calibration value of the relay 64 it is possible to make the opening of the armature circuit coincide with the end of energy regeneration, as in the preceding embodiments.

Again the speed of the motor can be controlled between its maximum speed, right down to zero while preserving the advantage of dynamic braking with energy regeneration and higher overall efficiency of the system due to low energy loses in the circuit.

In this embodiment of the invention it will be appreciated that there is an intrinsic non-uniformity of utilization of the cells 310, 312, 314, 316 of the battery, since the first cell of the battery is utilized for the greater part of the time and will therefore discharge more rapidly than the later ones, which are only called into use at higher speeds. This disadvantage, however, only concerns the range of the lowest speeds and not the whole operating range of the motor since the whole of the battery is connected for the upper half of the speed range. In order to avoid this disadvantage, even though it is limited, there have been provided commutator switches 318, 320, 322, 324 which are operated simultaneously by a coil 356, powered by the auxiliary battery 352 and controlled by a switch 358, in order to reverse the order in which the cells 310, 312, 314, 316 are switched into the circuit so as to render utilization of these cells more uniform. The switch 358 may be operated manually or else by means of some suitable automatic device (not shown).

Finally, FIG. 4 illustrates a variant of the embodiment of the invention just described. This embodiment differs from the embodiment of FIG. 3 by having the control circuit 10 of the shunt winding 6 supplies from the terminals of the armature circuit of the motor (node 410) instead of from the terminals of the whole battery (node 360) in FIG. 3.

In this case therefore, the voltage applied to the terminals of the shunt winding undergoes the same changes as that of the armature, that is, in the first control phase, as the accelerator is moved from the rest position, both the voltage of the armature and that of the shunt field winding are varied simultaneously from the nil value to that of the battery. This variant can have some advantages in certain cases in which it is wished to restrict the static torque of the engine.

I claim:

1. A battery powered electric motor system comprising in combination:
   a direct current compound electric motor
   battery means for supplying power to said motor,
   a rheostat in series with the shunt field winding of said compound electric motor,
   a voltage regulating device in circuit with the armature and series field winding of said compound electric motor, said voltage regulating device being linked to said rheostat for adjusting movement therewith, an operating means for adjusting said rheostat and said voltage regulating device, said operating means being movable between a rest position corresponding to de-energization of said motor, and a second position corresponding to maximum speed of said motor, said rheostat and said voltage regulating device being connected to said operating means such that a said operating means is moved from said rest position towards said second position said rheostat maintains said shunt field winding at maximum voltage while said voltage regulating device supplies said armature circuit with a progressively increasing voltage up to the maximum provided by said battery whereafter, on further movement of said operating means toward said second position said voltage regulating device maintains said armature circuit at said maximum value while said rheostat progressively reduces the voltage of said shunt field winding until said motor obtains its maximum speed, first circuit means for maintaining said motor energized when said operating means is returned to said rest position while said motor is running, as long as the speed of said motor remains above a predetermined value, and second circuit means for directly supplying power from said motor to said battery means when said operating means is returned to said rest position while said motor is running and as long as the speed of said motor remains above a predetermined value.

2. The battery powered electric motor system of claim 1 wherein said voltage regulating device is another rheostat connected between said battery and said armature circuit of said motor and said second circuit means includes a diode connected across the terminals of said other rheostat to allow the passage of reverse current from said motor to said battery to by pass the resistance of said rheostat.

3. The battery powered electric motor system of claim 1 wherein said first circuit means for maintaining said motor energized when said operating means is returned to said rest position while said motor is running as long as the speed of said motor remains above a predetermined value, comprises a relay controlled by a dynamo driven by said motor, said relay controlling a separate supply circuit between said armature circuit and said battery.

* * * * *